United States Patent [19]
Krämer et al.

[11] 3,914,427
[45] Oct. 21, 1975

[54] COMBATING FUNGI WITH 1-ETHYLIMIDAZOLES

[75] Inventors: Wolfgang Krämer; Karl Heinz Büchel; Werner Meiser, all of Wuppertal; Paul-Ernst Frohberger; Hans Scheinpflug, both of Leverkusen, all of Germany

[73] Assignee: Bayer Aktiengesellschaft, Leverkusen, Germany

[22] Filed: Feb. 1, 1974

[21] Appl. No.: 438,887

[30] Foreign Application Priority Data
Feb. 9, 1973 Germany............................ 2306495

[52] U.S. Cl................................. 424/273; 424/232
[51] Int. Cl.²............................................ A01N 9/22
[58] Field of Search ............. 242/273, 232; 260/309

[56] References Cited
UNITED STATES PATENTS
| | | | |
|---|---|---|---|
| 3,505,349 | 4/1970 | Beaman et al. | 260/309 |
| 3,641,047 | 2/1972 | Beaman et al. | 260/309 |
| 3,658,813 | 4/1972 | Grodefroi et al. | 260/240 |

OTHER PUBLICATIONS
Chem. Abst. 71, 30440(b), 1969, Hanson et al.

*Primary Examiner*—Albert T. Meyers
*Assistant Examiner*—D. W. Robinson
*Attorney, Agent, or Firm*—Burgess, Dinklage & Sprung

[57] ABSTRACT

Compositions containing and methods of using 1-ethylimidazoles of the formula

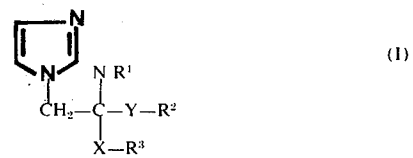

in which
  $R^1$ and $R^3$ each individually is hydrogen, alkyl, alkenyl, cycloalkyl, cycloalkenyl, optionally substituted aryl or optionally substituted aralkyl,
  $R^2$ is alkyl, alkenyl, alkynyl, cycloalkyl, cycloalkenyl, optionally substituted aryl or optionally substituted aralkyl,
  Y is oxygen or sulfur, and
  X is a keto group or a functional derivative of a keto group,
as such or in the form of salts, for combating fungi.

12 Claims, No Drawings

COMBATING FUNGI WITH 1-ETHYLIMIDAZOLES

The present invention relates to and has for its objects the provision of particular new active compositions in the form of mixtures with solid and liquid dispersible carrier vehicles of certain 1-ethylimidazoles which possess valuable strong fungicidal properties, and methods for using such compounds in a new way, especially for combating and controlling fungi with other and further objects becoming apparent from a study of the within specification and accompanying examples.

It has already been disclosed in Phytopathology 33 (1943) 1113 that zinc ethylene-1,2,-bis-dithiocarbamate (Compound A) can be used as a seed dressing and protective foliage fungicide. However, if low amounts and concentrations are used, its action is not satisfactory, especially when applied as a cereal shoot fungicide. It has also been disclosed in U.S. Pat. No. 3,321,366 that [bis-(4-chlorophenyl)-phenyl-methyl]-imidazole-(1) (Compound B) is very active against mildew and similar fungi. Here again, if low amounts and concentrations are used the action is not always entirely satisfactory if the substance is applied as a cereal shoot fungicide.

It has been found that compounds which are 1-ethylimidazoles of the general formula

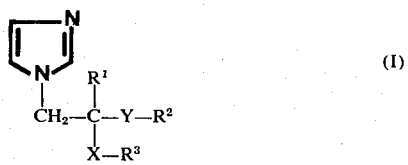

in which
R$^1$ and R$^3$ each individually is hydrogen, alkyl, alkenyl, cycloalkyl, cycloalkenyl, optionally substituted aryl or optionally substituted aralkyl,
R$^2$ is alkyl, alkenyl, alkynyl, cycloalkyl, cycloalkenyl, optionally substituted aryl or optionally substituted aralkyl,
Y is oxygen or sulfur, and
X is a keto group or a functional derivative of a keto group,
as such or in the form of salts, display good fungicidal properties.

Surprisingly, the 1-ethylimidazole compounds display a substantially greater fungicidal action than zinc ethylene-1,2-bis-dithiocarbamate and [bis-(4-chlorophenyl)-phenyl-methyl]-imidazole-(1) known from the state of the art. The active compounds used according to the invention thus represent an enrichment of the art.

In the formula (I), R$^1$, R$^2$ and R$^3$, when alkyl or alkenyl, and R$^2$ when alkynyl, are preferably straight-chain or branched with up to 6, especially up to 4, carbon atoms. As examples of such alkyl and alkenyl radicals R$^1$, R$^2$ and R$^3$, methyl, ethyl, n- and i-propyl, n-, i- and t-butyl, pentyl and hexyl, and vinyl, allyl, propenyl and hexenyl may be mentioned. Ethynyl, propynyl, butynyl and hexynyl may be mentioned as examples of R$^2$ when alkynyl.

R$^1$, R$^2$ and R$^3$ when cycloalkyl or cycloalkenyl preferably have up to 7, especially 3, 5 or 6, carbon atoms when cycloalkenyl. Cyclopropyl, cyclopentyl, cyclohexyl, cycloheptyl, cyclopentyl, cyclohexenyl and cycloheptenyl may be mentioned as examples.

R$^1$, R$^2$ and R$^3$ when optionally substituted aryl or aralkyl preferably represent aryl with 6 or 10 carbon atoms and aralkyl radicals with 6 or 10 carbon atoms in the aryl part and 1 to 4 carbon atoms in the alkyl part, especially optionally substituted phenyl or benzyl radicals. Such aryl and aralkyl radicals can contain one or more, preferably 1 to 3, and especially 1 or 2, identical or different substituents. Preferred substituents are halogen, such as fluorine, chlorine and bromine, haloalkyl with, preferably, 1 or 2 carbon atoms and 2 to 5 halogen atoms, especially chlorine or fluorine atoms, such as trifluoromethyl, straight-chain or branched alkyl with 1 to 4 carbon atoms, such as methyl, ethyl or n- and i-propyl, alkoxy or alkylthio with 1 to 4 carbon atoms, such as methoxy, ethoxy, methylthio or ethylthio, alkylsulfonyl with 1 to 4 carbon atoms in the alkyl part, such as methylsulfonyl and ethylsulfonyl, nitro, nitrile and optionally hydroxymethyl-substituted phenyl.

When X is a functional derivative of a keto group, it preferably is a ketal group, —C(OR)$_2$—, wherein R is hydrogen or alkyl of up to 4 carbon atoms, especially methyl or ethyl. The oximes and hydrazones may be mentioned as examples of further functional derivatives of a keto group for X.

In a particularly preferred case, R$^1$ is hydrogen, R$^2$ is phenyl or phenyl substituted by 1 to 3, especially 1 or 2, fluorine, chlorine, bromine, methyl, phenyl and/or hydroxymethylphenyl radicals, R$^3$ is t-butyl, X is the keto group and Y is oxygen.

The following may be mentioned as specific examples of the active compounds used according to the invention:
2-(4-chlorophenoxy)-1-imidazolyl-(1)-4,4-dimethyl-pentan-3-one,
2-(2,4,5-trichlorophenoxy)-1-imidazolyl-(1)-4,4-dimethylpentan-3-one,
2-(3-chlorophenoxy)-1-imidazolyl-(1)-4,4-dimethyl-pentan-3-one,
2-(3-chloro-4-methylphenoxy)-1-imidazol-(1)-4,4-dimethyl-pentan-3-one,
2-(3-trifluoromethyl-phenoxy)-1-imidazolyl-(1)-4,4-dimethyl-pentan-3-one,
2-phenoxy-1-imidazolyl-(1)-4,4-dimethyl-pentan-3-one,
2-(2,3-dimethylphenoxy)-1-imidazolyl-(1)-4,4-dimethyl-pentan-3-one,
2-(2,3-dimethylphenoxy)-1-imidazolyl-(1)-butan-3-one,
2-(2,3-dichlorophenoxy)-1-imidazolyl-(1)-3-phenyl-propan-3-one,
2-(3,4-dichlorophenoxy)-1-imidazolyl-(1)-3-phenyl-propan-3-one, 2-(4-chlorobenzyloxy)-1-imidazolyl-(1)-4,4-dimethyl-pentan-3-one,
2-(4-methoxyphenoxy)-1-imidazolyl-(1)-4,4-dimethyl-pentan-3-one,
2-(4-methylphenoxy)-1-imidazolyl-(1)-4,4-dimethyl-pentan-3-one,
2-(3-nitrophenoxy)-1-imidazolyl-(1)-4,4-dimethyl-pentan-3-one,
2-(2-chlorophenoxy)-1-imidazolyl-(1)-4,4-dimethyl-pentan-3-one, 2-(phenoxy)-1-imidazolyl-(1)-4,4-dimethyl-hexan-3-one,
2-(3-methylphenoxy)-1-imidazolyl-(1)-4,4-dimethyl-pentan-3-one,
2-(2-chloro-3-methylphenoxy)-1-imidazolyl-(1)-4,4-dimethyl-pentan-3-one,
2-(2,4-dimethylphenoxy)-1-imidazolyl-(1)-4,4-dimethyl-pentan-3-one,
2-(3,4-dimethylphenoxy)-1-imidazolyl-(1)-4,4-dimethyl-pentan-3-one,
2-(3-cyanophenoxy)-1-imidazolyl-(1)-4,4-dimethyl-hexan-3-one,
2-(3-trifluoromethylphenoxy)-1-imidazolyl-(1)-3-phenyl-propan-3-one,
2-(3-trifluoromethylphenoxy)-1-imidazolyl-(1)-4-phenyl-butan-3-one,
2-(2-chlorobenzyloxy)-1-imidazolyl-(1)-4-phenyl-butan-3-one,
2-(2-chlorobenzyloxy)-1-imidazolyl-(1)-4,4-dimethyl-pentan-3-one,
2-(4-methylbenzyloxy)-1-imidazolyl-(1)-4,4-dimethyl-pentan-3-one,
2-(3,4-dimethylphenoxy)-1-imidazolyl-(1)-3-phenyl-propan-3-one,
2-(4-methylthiophenoxy)-1-imidazolyl-(1)-4,4-dimethyl-pentan-3-one,
2-(2,4-dichlorophenoxy)-1-imidazolyl-(1)-4,4-dimethyl-pentan-3-one,
2-(4-bromophenoxy)-1-imidazolyl-(1)-4,4-dimethyl-pentan-3-one,
2-(4-fluorophenoxy)-1-imidazolyl-(1)-4,4-dimethyl-pentan-3-one,
2-(2-chloro-4-methylphenoxy)-1-imidazolyl-(1)-4,4-dimethyl-pentan-3-one,
2-(4-nitrophenoxy)-1-imidazolyl-(1)-4,4-dimethyl-pentan-3-one,
2-(2,4,5-tribromophenoxy)-1-imidazolyl-(1)-4,4-dimethyl-pentan-3-one,
2-(3,4-dimethoxyphenoxy)-1-imidazolyl-(1)-4,4-dimethyl-pentan-3-one,
2-(2-phenylphenoxy)-1-imidazolyl-(1)-4,4-dimethyl-pentan-3-one and
2-(2-fluoro-4-methylphenoxy)-1-imidazolyl-(1)-4,4-dimethyl-pentan-3-one.

As salts of 1-ethyl-imidazoles of the formula I, those of physiologically tolerated acids are often preferred. Examples of such acids are the hydrogen halide acids, especially hydrochloric acid and hydrobromic acid, phosphoric acid, nitric acid, monofunctional and bifunctional aliphatic and aromatic carboxylic acids and hydroxycarboxylic acids, for example acetic acid, maleic acid, succinic acid, fumaric acid, tartaric acid, citric acid, salicyliic acid, sorbic acid and lactic acid, and 1,5-naphthalenedisulfonic acid.

The active compounds used according to the invention are new; the compounds as such, and their preparation, however already form the subject of an earlier patent application, application Ser. No. 390,042 filed Aug. 20, 1973, now pending, the disclosure of which is incorporated herein by reference. They can be prepared by either reacting corresponding 2-haloethyl ketones or 2-hydroxyethyl ketones (or their derivatives) or, in the case that $R^1$ in the formula (I) represents hydrogen, corresponding 1-haloethyl ketones (or their derivatives), with imidazole in suitable organic solvents, the reaction temperatures in the former case preferably being 80° to 150°C and in the latter case preferably 60° to 120°C. In both cases, compounds of the formula (I) are obtained. The working up of the reaction mixture and the purification of the reaction products may be carried out according to processes customary in the laboratory (compare, in this context, the preparative examples below).

The active compounds, according to the invention display a strong fungitoxic action. They do not damage crop plants in the concentrations required for combating fungi and have a low toxicity towards warmblooded animals. For these reasons they are suitable for use as plant protection agents for combating fungi. Fungitoxic agents are employed in plant protection for combating Archimycetes, Phycomycetes, Ascomycetes, Basidiomycetes and Fungi Imperfecti.

The active compounds according to the invention have a very broad spectrum of action and can be used against parasitary fungi which attack above-ground parts of plants or attack the plants through the soil, and against seed-borne pathogens.

They display a particularly good activity against parasitary fungi on above-ground parts of plants, such as *Phytophthora* species, *Erysiphe* species, *Peronospora* species, *Venturia* species, *Puccinia* species and *Helminthosporium* species, and also against *Pyricularia* species and *Pellecularia* species, as well as against tropical fungi such as *Mycosphaerella musicola*.

As plant protection agents, the active compounds according to the invention can be used with particularly good success for combating mildew in cereals and rust in cereals.

It is worthy of particular notice that the active compounds according to the invention not only display a protective action but also have a curative action, that is to say when used after contamination with the spores of the fungus. Furthermore, the systemic action of the compounds should be pointed out. Thus it is possible to protect plants against fungal attack by supplying the active compound via the soil and the root to the above-ground parts of the plant. As plant protection agents, the compounds according to the invention can be used for the treatment of soil, for the treatment of seed and for the treatment of above-ground parts of plants.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, Such active compounds may be employed alone or in the form of mixtures with one another and/or with such solid and/or liquid dispersible carrier vehicles and/or with other known compatible active agents, especially plant protection agents, such as other fungicides, or insecticides, acaricides, bactericides, rodenticides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application of field application generally contemplate those in which the active compound is present in an amount substantially between about 0.00001–1%, preferably 0.0001–0.1% by weight of the mixture. Thus, the present invention contemplates over-all compositions which comprises mixtures of a conventional dispersible carrier vehicle such as (1) a dispersible inert finely divided carrier solid, and/or (1) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0000.1–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g/hectare, preferably 40 to 600 g/hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

The formulations may be diluted for actual application. When they are used as leaf fungicides, the concentrations of the active compounds in the use forms can be varied within a wide range. They are generally from 1 to 0.00001 per cent by weight and preferably 0.1 to 0.0001%.

In the dressing of seed, the amounts of active compound applied are generally from 0.01 to 50 g per kilogram of seed, preferably 0.01 to 5g.

For the treatment of soil, the amounts of active compound applied are generally from 1 to 1,000g per cubic meter of soil, preferably from 10 to 200 g.

Furthermore, the present invention contemplates methods of selectively killing, combating or controlling fungi, which comprises applying to at least one of correspondingly (a) such fungi and (b) the corresponding habitat thereof, i.e. the locus to be protected, a correspondingly combative or toxic amount, i.e. a fungicidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, dry dressing, moist dressing, wet dressing, encrusting, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular active compounds of the present invention are illustrated, without limitation, by the following examples:

EXAMPLE 1

Shoot treatment test/cereal mildew/protective
(leaf-destroying mycosis)

To produce a suitable preparation of active compound, 0.25 part by weight of active compound was taken up in 25 parts by weight of dimethylformamide and 0.06 part by weight of Emulsifier W, and 975 parts by weight of water were added. The concentrate was diluted with water to the desired final concentration of the spray liquor.

In order to test the protective activity, young barley plants of the Amsel variety, having one leaf, were sprayed with the preparation of active compound until dewmoist. After drying off, the barley plants were dusted with spores of *Erysiphe graminis* var. *hordei*.

After leaving the plants for 6 days at a temperature of 21°–22°C and 80–90% atmospheric humidity, the occurrence of mildew pustules on the plants was evaluated. The degree of infection is expressed in per cent of the infection of the untreated control plants. 0% denotes no infection and 100% denotes the same degree of infection as in the case of the untreated control. The lower the infection with rust, the more active is the compound being tested.

The active compounds, active compound concentrations in the spray liquor and degrees of infection can be seen from Table 1 which follows:

Table 1

Shoot treatment test/cereal mildew/protective

| Active compounds | | Active compound concentration in the spray liquor, in % by weight | Infection in % of the untreated control |
|---|---|---|---|
| untreated | | — | 100.0 |
| CH₂–NH–C(=S)–S \ Zn / CH₂–NH–C(=S)–S  (known) | (A) | 0.3<br>0.1 | 64.0<br>80.5 |
| Cl–C₆H₄–C(C₆H₅)(C₆H₄–Cl)–N(imidazole)  (known) | (B) | 0.01<br>0.005 | 82.5<br>100.0 |
| Cl–C₆H₄–O–CH(CH₂–imidazole)–CO–C(CH₃)₃ | (1) | 0.01<br>0.005 | 16.3<br>41.3 |
| Cl–C₆H₄–O–CH(CH₂–imidazole)–CO–C(CH₃)₃ · xHCl | (1a) | 0.01 | 25.0 |
| Cl₂–C₆H₃–O–CH(CH₂–imidazole)–CO–C(CH₃)₃ · xHCl | (5a) | 0.01<br>0.001 | 12.5<br>21.3 |
| Br–C₆H₄–O–CH(CH₂–imidazole)–CO–C(CH₃)₃ · xHCl | (6a) | 0.005 | 0.0 |
| Cl–C₆H₄–O–CH(CH₂–imidazole)–CO–C(CH₃)₃ · xHCl | (8a) | 0.01<br>0.005 | 0.0<br>55.0 |
| Cl–C₆H₄–O–CH(CH₂–imidazole)–CO–C(CH₃)₃ · xHCl | (9a) | 0.01 | 41.3 |

Table 1-Continued

Shoot treatment test/cereal mildew/protective

| Active compounds | Active compound concentration in the spray liquor, in % by weight | Infection in % of the untreated control |
| --- | --- | --- |
| (10a) 2,4,5-trichlorophenyl ether compound with imidazole, xHCl | 0.01 | 25.0 |
| (12a) chloro-methylphenyl ether compound with imidazole | 0.01<br>0.005 | 12.5<br>21.3 |
| (14) biphenyl ether compound with imidazole | 0.01<br>0.005 | 25.0<br>66.3 |
| (18a) methyl-methylphenyl ether compound with imidazole, xHCl | 0.01 | 12.5 |

EXAMPLE 2

Shoot treatment test/cereal rust/protective (leaf-destroying mycosis)

To produce a suitable preparation of active compound 0.25 part by weight of active compound was taken up in 25 parts by weight of dimethylformamide and 0.06 part by weight of Emulsifier W, and 975 parts by weight of water were added. The concentrate was diluted with water to the desired final concentration of the spray liquor.

To test the protective activity, young wheat plants of the Michigan Amber variety, having one leaf, were inoculated with a uredospore suspension of 1 Puccinia recondita in 0.1% strength aqueous agar. After the spore suspension had dried off, the wheat plants were sprayed with the preparation of active compound until dew-moist and were placed in a greenhouse to incubate for 24 hours at about 20°C and 100% atmospheric humidity.

After leaving the plants for 10 days at a temperature of 20°C and 80–90% atmospheric humidity, the occurrence of rust pustules on the plants was evaluated. The degree of infection was expressed in per cent of the infection of the untreated control plants. 0% denotes no infection and 100% denotes the same degree of infection as in the case of the untreated control. The lower the infection with rust, the more active is the compound being tested.

The active compounds, active compound concentrations in the spray liquor and degrees of infection can be seen from Table 2 which follows:

Table 2

Shout treatment test/cereal rust/protective

| Active compounds | Active compound concentration in the spray liquor, in % by weight | Infection in % of the untreated control |
| --- | --- | --- |
| untreated | — | 100.0 |
| (A) zinc dithiocarbamate (known) | 0.025<br>0.01 | 100.0<br>100.0 |
| (B) bis(4-chlorophenyl)phenyl imidazolyl methane (known) | 0.025 | 88.8 |

Table 2 -Continued

Shout treatment test/cereal rust/protective

| Active compounds | Active compound concentration in the spray liquor, in % by weight | Infection in % of the untreated control |
|---|---|---|
| (known) (C) — F-phenyl, phenyl, 4-Cl-phenyl, C-N(imidazole) | 0.025 | 88.8 |
| (known) (D) — 3-F-phenyl, phenyl, 4-Cl-phenyl, C-N(imidazole) | 0.025 | 88.8 |
| (5a) 2,4-Cl₂-phenyl—O—CH(CH₂-N-imidazole)—CO—C(CH₃)₃ · xHCl | 0.025 | 15.0 |
| (6a) 4-Br-phenyl—O—CH(CH₂-N-imidazole)—CO—C(CH₃)₃ · xHCl | 0.025 | 30.0 |
| (14) biphenyl—O—CH(CH₂-N-imidazole)—CO—C(CH₃)₃ | 0.025 | 0.0 |
| | 0.01 | 9.5 |

EXAMPLE 3

Mycelium growth test

Nutrient medium used:
20 parts by weight of agar-agar
200 parts by weight of potato decoction
5 parts by weight of malt
15 parts by weight of dextrose
5 parts by weight of peptone
2 parts by weight of $Na_2HPO_4$
0.3 part by weight of $Ca(NO_3)_2$
Proportion of solvent to nutrient medium:
2 parts by weight of solvent mixture
100 parts by weight of agar nutrient medium
Composition of solvent mixture 0.19 part by weight of DMF or acetone
0.01 part by weight of emulsifier Alkylarylpolyglykolather
1.80 parts by weight of water
2 parts by weight of solvent mixture The amount of active compound required for the desired concentration of active compound in the nutrient medium was mixed with the stated amount of solvent. The concentrate was thoroughly mixed, in the stated proportion, with the liquid nutrient medium (which had been cooled to 42°C) and was then poured into Petri dishes of 9 cm diameter. Control dishes to which the preparation had not been added were also set up. when the nutrient medium had cooled and solidified, the dishes were inoculated with the species of fungi stated in the table and incubated at about 21°C.

Evaluation was carried out after 4–10 days, dependent upon the speed of growth of the fungi. When evaluation was carried out the radial growth of the mycelium on the treated nutrient media was compared with the growth on the control nutrient media. In the evaluation of the fungus growth, the following characteristic values were used:

1 no fungus growth
up to 3 very strong inhibition of growth
up to 5 medium inhibition of growth
up to 7 slight inhibition of growth
9 growth equal to that of untreated control The active compounds, their concentrations and the results obtained can be seen from the following table:

Table 3

| Active compounds | | Mycelium growth test (Active compound concentration, 10 ppm) | | | | | | | |
|---|---|---|---|---|---|---|---|---|---|
| | | A | B | C | D | E | F | G | H |
| CH₂—NH—CS—S\\Zn / CH₂—NH—CS—S (known) (A) | | 9 | 9 | 9 | 5 | 5 | 9 | 9 | 9 |
| (5a) | | 5 | 1 | 1 | 1 | 1 | 5 | 1 | 1 |
| (6a) | | — | — | 1 | 3 | 5 | 5 | 5 | 3 |
| (8a) | | — | 3 | 1 | 1 | 3 | 3 | 1 | 2 |
| (12a) | | 5 | 2 | 1 | 1 | 1 | 1 | 1 | 1 |
| (14) | | 3 | 1 | 1 | 1 | 1 | 1 | 1 | 1 |
| (10a) | | — | 3 | 1 | 1 | 5 | 5 | 1 | 3 |

A *Verticillium alboatrum*
B *Pyricularia oryzae*
C *Philophora cinerescens*
D *Helminthosporium gramineum*
E *Mycosphaerella musicola*
F *Phytophtora cyctorum*
G *Venturia inaequalis*
H *Pellicularia sasakii*

The synthesis of the active compounds is illustrated in the following examples:

EXAMPLE 4 a. Starting material

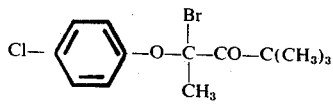

The starting material, 2-(4-chlorophenoxy)-2-bromo-4,4-dimethyl-pentan-3-one, was obtained by bromination of 2-(4-chlorophenoxy)-4,4-dimethyl-pentan-3-one with elementary bromine in carbon tetrachloride at 40°–50°C; melting point: 95°C.

b.

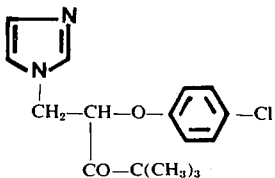

16.0 (0.05 mole) of 2-(4-chlorophenoxy)-2-bromo-4,4-dimethyl-pentan-3-one in 120 ml of acetonitrile and 12 g (0.207 mole) of imidazole were heated to the boil under reflux for 12 hours. The solvent was then distilled off almost to dryness in vacuo and 50 ml of ether and 50 ml of a saturated solution of hydrogen chloride in ether were then added. The resulting oil was decanted off and boiled up three times with 50 ml of ether at a time, and the ether phase was decanted off. The oil which remained was taken up in 120 ml of methylene chloride, the solution was mixed with 50 ml of water, 20 g of solid sodium bicarbonate were added, the organic phase was separated off and the aqueous phase was extracted twice with 50 ml of methylene chloride at a time. The combined organic phases were washed twice with 50 ml of water at a time, dried over sodium sulfate and stripped by distillation in vacuo. The resulting oil was triturated with ligroin/petroleum ether, whereupon it crystallized. After recrystallization from ligroin/petroleum ether, 2.6 g of 2-(4-chlorophenoxy)-1-imidazolyl-(1)-4,4-dimethyl-pentan-3-one (representing 17% of theory) of melting point 68°–73°C were obtained.

EXAMPLE 5 a. Starting material

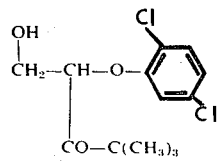

26.1 g (0.1 mole) of 1-(2,5-dichlorophenoxy)-3,3-dimethyl-butan-2-one were dissolved in 200 ml of ethanol and 20 g (0.24 mole) of 40% strength formaldehyde solution were added thereto, followed by about 5 ml of 10% strength sodium hydroxide solution until pH 9 was reached. The reaction mixture was heated for 3 hours under reflux and the solvent was distilled off in vacuo. The resulting precipitate was filtered off and well rinsed with petroleum ether. The filtrate was concentrated in vacuo. An oil remained, which was crude 2-(2,5-dichlorophenoxy)-1-hydroxy-4,4-dimethyl-pentan-3-one.

b.

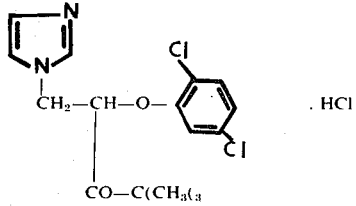

(2a)

29.1 g (0.1 mole) of 2-(2,5-dichlorophenoxy)-1-hydroxy-4,4-dimethyl-pentan-3-one were taken up in 200 ml of toluene, 10.2 g (0.14 mole) of imidazole were added dropwise thereto and the reaction solution was boiled for 3 hours under a water separator. Thereafter, the solvent was distilled off in vacuo, 100 ml of water were added to the resulting oil and the mixture was extracted twice with 100 ml of methylene chloride at a time. The organic phase was washed twice with 50 ml of water and dried over sodium sulfate, and the solvent was distilled off in vacuo. An oil was obtained, which was taken up in 50 ml of ether and treated with 50 ml of ether saturated with dry hydrogen chloride. The solvent was distilled off in vacuo, the resulting oil was taken up in a mixture of 500 ml of ligroin and 300 ml of ethyl acetate and the solution was heated to the boil under reflux. After carefully pouring off the resulting solution and cooling it, 18.5 g (representing 49% of theory) of 2-(2,5-dichlorophenoxy)-1-imidazolyl-(1)-4,4-dimethyl-pentan-3-one hydrochloride precipitated as colorless crystals which were isolated by filtration.

Melting point: 162°C (decomposition)

EXAMPLE 6 a. Starting material

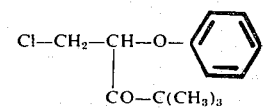

22.3 g (0.1 mole) of 1-hydroxy-2-phenoxy-4,4-dimethyl-pentan-3-one (prepared according to Example 5a) were dissolved in 120 ml of methylene chloride and 7.3 ml (0.1 mole) of thionyl chloride were added dropwise to this solution at room temperature. The start of the reaction was accelerated by gentle warming. After 3 hours' reaction time at room temperature, the solvent was distilled off in vacuo and the oily residue was degassed in a high vacuum. 21.8 g (representing 91% of theory) of 1-chloro-2-phenoxy-4,4-dimethyl-pentan-3-one were obtained as an oil of refractive index $n_D^{20} = 1.5081$.

b.

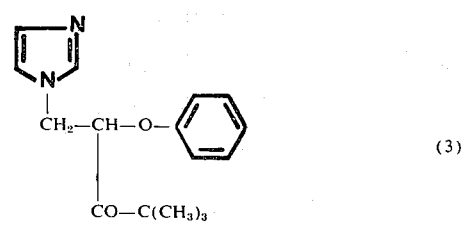

(3)

24 g (0.1 mole) of 1-chloro-2-phenoxy-4,4-dimethyl-pentan-3-one of refractive index $n_D^{20} = 1.5081$ were added to a solution of 13.6 g (0.2 mole) of imidazole in 150 ml of anhydrous acetonitrile. The resulting solution was heated to the boil under reflux for 4 hours; the solvent was then distilled off in vacuo. The residue was washed with water and taken up in methylene chloride, and the solution was dried over sodium sulfate. After distilling off the solvent, 25.3 g (representing 93% of theory) of 2-phenoxy-1-imidazolyl-(1)-4,4-dimethyl-pentan-3-one were obtained as an oil of refractive index $n_D^{20} = 1.5193$, which crystallized after some time and when recrystallized from petroleum ether had a melting point of 75°C.

The following compounds of the general formula

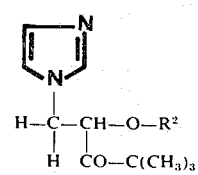

where obtained by processes analogous to those of Examples 4 to 6, as described in above-mentioned application Ser. No. 390,042, with good results in each case:

| Compound | R² | Melting point °C | |
|---|---|---|---|
| 4 | –C₆H₄–Cl (4-chlorophenyl) | Hydrochloride 127 | |
| 5 | 2,4-dichlorophenyl | Hydrochloride 118 | free base 85–87 |
| 6 | 4-bromophenyl | Hydrochloride 148–150 | |
| 7 | 4-fluorophenyl | 102–106 | |
| 8 | 2-chlorophenyl | Hydrochloride 146–148 | free base 77–79 |
| 9 | 3-chlorophenyl | Hydrochloride 82–90 | free base 80–82 |
| 10 | 2,4,5-trichlorophenyl | Hydrochloride 180–183 | |
| 11 | 4-methylphenyl | Hydrochloride 135 | |
| 12 | 4-chloro-2-methylphenyl | Hydrochloride 147–150 | free base 49–51 |
| 13 | 2-biphenylyl | Hydrochloride 144–146 | |
| 14 | 4-biphenylyl | 111–112 | |
| 15 | biphenylyl-CH₂OH * | 105–107 | |

* Position of the CH₂OH group not known

| Compound | R² | Melting point °C | |
|---|---|---|---|
| 16 | 2,6-dimethylphenyl | Hydrochloride 143–147 | free base 97–98 |
| 17 | 3,5-dimethylphenyl | Hydrochloride 164–165 | |
| 18 | 2,5-dimethylphenyl | Hydrochloride 157 | |
| 19 | 4-nitrophenyl | 119–120 | |

-Continued

| Compound | R² | Melting point °C |
|---|---|---|
| 20 | 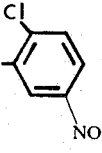 | 122'123 |
| 21 | 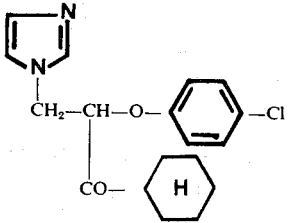 | Hydrochloride 148–150 |

Other compounds of formula (I) which can be similarly produced from corresponding starting materials include:

| Compound | R² | Melting Point °C | |
|---|---|---|---|
| 22 | 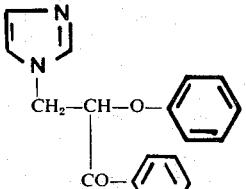 | Hydrochloride 173 | free base 68–70 |
| 23 | 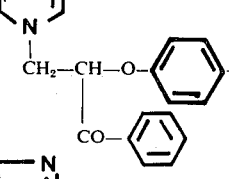 | 89–91 | |
| 24 | 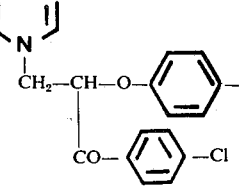 | 137–139 | |
| 25 | 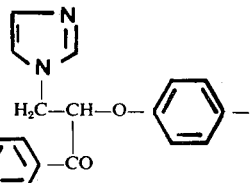 | free base 152–154 | |
| 26 | 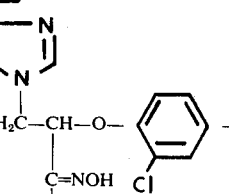 | 139°C | |
| 27 | 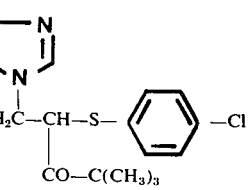 | 101°C | |

It will be appreciated that the instant specification and examples are set forth by way of illustration and not limitation, and that various modifications and changes may be made without departing from the spirit and scope of the present invention.

What is claimed is:
1. The method of combating fungi which comprises applying to said fungi or a fungus habitat a fungicidally effective amount of a compound of the formula

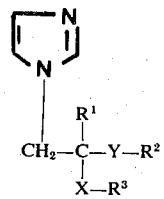

in which
  R¹ and R³ each individually is hydrogen; alkyl or alkenyl of up to 6 carbon atoms; cycloalkyl or cycloalkenyl of up to 7 carbon atoms; or aryl of 6 to 10 carbon atoms or alkyl substituted by aryl of 6 to 10 carbon atoms either optionally carrying up to 3 halogen, haloalkyl with up to 2 carbon atoms and 2 to 5 halogen atoms, nitro, cyano, phenyl, hydroxymethyl-substituted phenyl, or alkyl alkoxy, alkylthio or alkylsulfonyl radicals wherein the alkyl moieties have up to 4 carbon atoms;
  R² is alkyl, alkenyl or alkynyl of up to 6 carbon atoms; cycloalkyl or cycloalkenyl of up to 7 carbon atoms; or aryl of 6 to 10 carbon atoms or alkyl substituted by aryl of 6 to 10 carbon atoms either optionally carrying up to 3 halogen, haloalkyl with up to 2 carbon atoms and 2 to 5 halogen atoms, nitro, cyano, phenyl, hydroxymethyl-substituted phenyl, or alkyl, alkoxy, alkylthio or alkylsulfonyl radicals wherein the alkyl moieties have up to 4 carbon atoms;
  Y is oxygen or sulfur, and
  X is —CO—, the oxime or hydrazone thereof.

2. The method of claim 1 wherein R¹ is hydrogen, R² is phenyl, benzyl, or phenyl or benzyl substituted with up to 3 fluorine, chlorine, bromine, methyl, trifluoromethyl, methoxy, methylthio, nitro, cyano, phenyl or hydroxymethylphenyl radicals, R³ is t-butyl, methyl, phenyl, 1,1-dimethylpropyl, benzyl, cyclohexyl or chlorophenyl, X is the keto group and Y is oxygen.

3. The method of claim 2 wherein the compound is applied in the form of its hydrochloric, hydrobromic, phosphoric, nitric, acetic, maleic, succinic, fumaric, tartaric, citric, salicylic, sorbic, lactic or 1,5-naphthalenedisulfonic acid salt.

4. The method of claim 1 wherein R¹ is hydrogen, R² is phenyl or phenyl substituted with up to 3 fluorine, chlorine, bromine, methyl, phenyl or hydroxymethylphenyl radicals, R³ is t-butyl, X is the keto group and Y is oxygen.

5. The method of claim 4 wherein the compound is 2-(4-chlorophenoxy)-1-imidazolyl-(1)-4,4-dimethyl-pentan-3-one.

6. The method of claim 4 wherein the compound is 2-(2,4-dichlorophenoxy)-1-imidazolyl-(1)-4,4-dimethyl-pentan-3-one.

7. The method of claim 4 wherein the compound is 2-(4-bromophenoxy)-1-imidazolyl-(1)-4,4-dimethyl-pentan-3-one.

8. The method of claim 4 wherein the compound is 2-(2-chlorophenoxy)-1-imidazolyl-(1)-4,4-dimethyl-pentan-3-one.

9. The method of claim 4 wherein the compound is 2-(2-methyl-4-chlorophenoxy)-1-imidazolyl-(1)-4,4-dimethyl-pentan-3-one.

10. The method of claim 4 wherein the compound is 2-(4-phenylphenoxy)-1-imidazolyl-(1)-4,4-dimethyl-pentan-3-one.

11. A fungicidal composition comprising a compatible diluent and a fungicidally effective amount of a compound of the formula

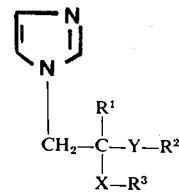

in which
  R¹ and R³ each individually is hydrogen; alkyl or alkenyl of up to 6 carbon atoms; cycloalkyl or cycloalkenyl of up to 7 carbon atoms; or aryl of 6 to 10 carbon atoms or alkyl substituted by aryl of 6 to 10 carbon atoms either optionally carrying up to 3 halogen, haloalkyl with up to 2 carbon atoms and 2 to 5 halogen atoms, nitro, cyano, phenyl, hydroxymethyl-substituted phenyl, or alkyl, alkoxy, alkylthio or alkylsulfonyl radicals wherein the alkyl moieties have up to 4 carbon atoms;
  R² is alkyl, alkenyl or alkynyl of up to 6 carbon atoms; cycloalkyl or cycloalkenyl of up to 7 carbon atoms; or aryl of 6 to 10 carbon atoms or alkyl substituted by aryl of 6 to 10 carbon atoms either optionally carrying up to 3 halogen, haloalkyl with up to 2 carbon atoms and 2 to 5 halogen atoms, nitro, cyano, phenyl, hydroxymethyl-substituted phenyl, or alkyl, alkoxy, alkylthio or alkylsulfonyl radicals wherein the alkyl moieties have up to 4 carbon atoms;
  Y is oxygen or sulfur, and
  X is —CO—, the oxime or hydrazone thereof.

12. The composition according to claim 11 wherein such compound is
  2-(4-chlorophenoxy)-1-imidazolyl-(1)-4,4-dimethyl-pentan-3-one,
  2-(2,4-dichlorophenoxy)-1-imidazolyl-(1)-4,4-dimethyl-pentan-3-one,
  2-(4-bromophenoxy)-1-imidazolyl-(1)-4,4-dimethyl-pentan-3-one,
  2-(2-chlorophenoxy)-1-imidazolyl-(1)-4,4-dimethyl-pentan-3-one,
  2-(2-methyl-4-chlorophenoxy)-1-imidazolyl-(1)-4,4-dimethyl-pentan-3-one, or
  2-(4-phenylphenoxy)-1-imidazolyl-(1)-4,4-dimethyl-pentan-3-one.

* * * * *